United States Patent [19]

Gnyra

[11] 3,906,084
[45] Sept. 16, 1975

[54] PRECIPITATION OF ALUMINA TRIHYDRATE FROM BAYER PREGNANT LIQUORS

[75] Inventor: Bohdan Gnyra, Arvida, Canada

[73] Assignee: Alcan Research and Development Limited, Montreal, Canada

[22] Filed: Sept. 21, 1971

[21] Appl. No.: 182,481

[52] U.S. Cl. ............... 423/629; 423/625; 423/630; 423/127; 423/121
[51] Int. Cl. ............................................. C01f 7/02
[58] Field of Search ............ 423/625, 629, 630, 127

[56] References Cited
UNITED STATES PATENTS
2,283,849  5/1942  Coles .............................. 423/629 X FOREIGN PATENTS OR APPLICATIONS
957  4/1859  United Kingdom OTHER PUBLICATIONS
Reese et al., "Industrial and Engineering Chemistry," Vol. 47, No. 9, pp. 1672–1680, (1955).
Linke, "Solubilities of Inorganic and Metal Organic Compounds," 4th Ed., Vol. 1, p. 547, (1958).

Primary Examiner—Herbert T. Carter
Attorney, Agent, or Firm—Cooper, Dunham, Clark, Griffin & Moran

[57] ABSTRACT

In the operation wherein fine seed alumina trihydrate is added as a precipitating agent to Bayer pregnant liquor for the precipitation of alumina trihydrate therefrom there is precipitated a coarser alumina trihydrate, as evidenced by the percentage of precipitated alumina trihydrate having a particle size greater than 325 mesh, by carrying out the precipitation of the alumina trihydrate from said Bayer pregnant liquor in the presence of added calcium carbonate. The increase in the amount of the resulting precipitated alumina trihydrate having a particle size greater than 325 mesh when precipitated in the presence of calcium carbonate is especially evident when the Bayer pregnant liquor has a caustic content measured as $Na_2CO_3$ in the range from about 180 grams per liter to about 200 grams per liter and the calcium carbonate is present in the pregnant liquor in an amount in the range from about 0.05 to about 0.10 grams per liter based on the Bayer pregnant liquor.

7 Claims, 1 Drawing Figure

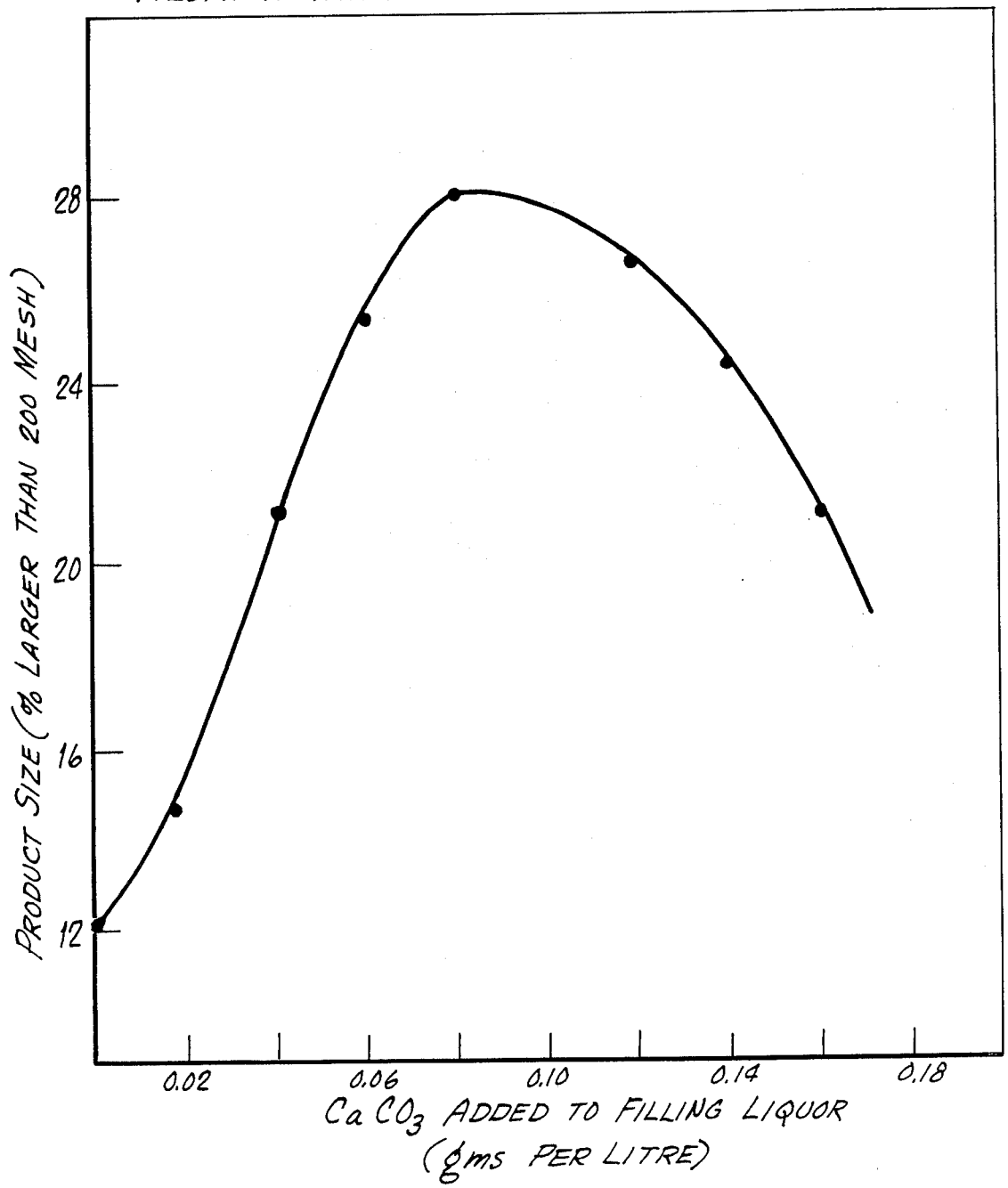

PRECIPITATION OF ALUMINA TRIHYDRATE FROM BAYER PREGNANT LIQUORS

This invention relates to the production of alumina trihydrate. More particularly, this invention relates to the production of alumina trihydrate via the Bayer process wherein bauxite is digested with an aqueous caustic (NaOH) solution and wherein the alumina trihydrate is precipitated from the resulting filtered Bayer pregnant liquor by the addition thereto of finely divided seed alumina trihydrate as a precipitating agent for the precipitation of the alumina trihydrate from the Bayer pregnant liquor.

It is desirable to produce an alumina trihydrate having a coarse or relatively large particle size so as to reduce dust losses during calcination and in the potrooms wherein elemental aluminum is produced by electrolysis of alumina. For example, it is especially desirable when alumina trihydrate is precipitated from Bayer pregnant liquor to produce or to precipitate an alumina trihydrate produce having a particle size such that no more than about 6% by weight of the precipitated alumina trihydrate has a particle size smaller than 325 mesh.

Accordingly, it is an object of this invention to provide an improved process for the precipitation of alumina trihydrate from Bayer pregnant liquor produced by the digestion of alumina-contaning ore, e.g. bauxite, with an aqueous caustic (NaOH) solution.

It is another object of this invention to provide a process for the precipitation of alumina trihydrate having a relatively large or coarser particle size upon precipitation from Bayer pregnant liquor in the presence of added finely divided seed alumina trihydrate.

Still another object of this invention is to provide a process for the precipitation of a coarser alumina trihydrate product, as evidenced by a smaller percentage of said product having a particle size smaller than 325 mesh, when precipitated from Bayer pregnant liquor wherein the Bayer pregnant liquor has a relatively high caustic concentration, such as above about 160 grams per liter (gpl) caustic measured as $Na_2CO_3$.

How these and other objects of this invention are achieved will become apparent in the light of the accompanying disclosure made with reference to the accompanying drawing wherein there is graphically illustrated the effect of $CaCO_3$ on the particle size of alumina trihydrate when precipitated from a Bayer pregnant liquor. In at least one embodiment of the practice of this invention at least one of the foregoing objects will be achieved.

It has been discovered that when alumina trihydrate is precipitated from Bayer pregnant liquor in the presence of added fine seed alumina trihydrate as a precipitating agent for the precipitation of the alumina trihydrate there is precipitated a coarser alumina trihydrate product from said Bayer pregnant liquor when the precipitation of the alumina trihydrate is carried out in the presence of an added small amount of finely divided calcium carbonate, such as an amount in the range from about 0.02 gram per liter to about 0.20 gram per liter based on the Bayer pregnant liquor.

The practices of this invention are particularly applicable to relatively high caustic Bayer pregnant liquors, such as liquors having a caustic content above about 160 grams per liter caustic measured as $Na_2CO_3$, such as Bayer pregnant liquors having a caustic content in the range from about 175–200 gpl caustic and a causticity in the range of about 75–90%, more or less. A coarser alumina trihydrate product is obtainable in accordance with the practices of this invention by adding small amounts of finely divided calcium carbonate ($CaCO_3$) to the seeded Bayer pregnant liquors, such as an amount in the range of about 0.05–0.10 gram per liter calcium carbonate based on the Bayer pregnant liquor undergoing treatment. The calcium carbonate may be added prior to the addition of the finely divided alumina trihydrate seed, simultaneously therewith, or after the addition of the alumina trihydrate seed. It has been observed that when the precipitation of the alumina trihydrate is carried out in the presence of calcium carbonate there is substantially little, if any, reduction in liquor productivity, i.e. in the practical amount of alumina trihydrate recoverable by precipitation from the Bayer pregnant liquor undergoing treatment.

In the practice of this invention the amount of added $CaCO_3$ is based on the Bayer pregnant liquor, i.e. the liquor remaining after filtration of the Bayer digest for removal of solid residues, such as the "red mud". Thus only filtered clear Bayer pregnant liquor is used for alumina precipitation in the practices of this invention.

In the examples set forth hereinafter certain terms well understood by those skilled in the art are employed. Specifically, total titratable soda (TTS) is the sum of the NaOH (measured as $Na_2CO_3$) and the true $Na_2CO_3$ present in the liquor. By way of example, a Bayer liquor which contains 180 gpl caustic (measured as $Na_2CO_3$) along with 60 gpl true $Na_2CO_3$ would measure 240 gpl total titratable soda (TTS).

Other terms, such as causticity and filling liquor ratio, are defined as follows:

1. "Percent Liquor Causticity" ("Liquor Causticity") $= \dfrac{gpl \text{ Caustic Soda}}{gpl \text{ TTS}} \times 100$ 2. "Filling Ratio" $= \dfrac{gpl \text{ Alumina in Solution}}{gpl \text{ Caustic Soda in Solution}}$ also ("Filtrate Ratio" or "Pregnant Liquor Ratio")

The "End" or "Spent Liquor" ratio is defined in the same manner, i.e.

$$\dfrac{gpl \text{ Alumina in Solution}}{gpl \text{ Caustic Soda in Solution}}$$

The following examples are illustrative of the practices of this invention and the advantages obtainable therefrom.

EXAMPLE 1

Tests involving the precipitation of alumina trihydrate from Bayer pregnant liquor in the presence and absence of added calcium carbonate were carried out. These tests and the results obtainable are set forth in accompanying Table I:

TABLE I

ALUMINA TRIHYDRATE PRECIPITATION
WITHOUT AND WITH ADDED $CaCO_3$

| Sample Description | End Ratio (calculated) | Product Particle Size ($\mu$) +74 | +53 | −44 | −33 |
|---|---|---|---|---|---|

Test No. 1

TABLE I-continued

ALUMINA TRIHYDRATE PRECIPITATION WITHOUT AND WITH ADDED CaCO₃

| Sample | Description | End Ratio (calculated) | Product Particle Size ($\mu$) +74 | +53 | −44 | −33 |
|---|---|---|---|---|---|---|
| Conditions: | Plant Filling Liquor: | 118.6/189.5 = 0.626, T.T.S. 238.5 gpl | | | | |
| | Seed: Plant fine seed (80% −325 mesh) at 60 gpl charge | | | | | |
| | Precipitation: 24 hrs. at 155°F., in duplicate | | | | | |
| 1 | No CaCO₃ added | 0.373 | 16.2 | 71.3 | 8.3 | 2.3 |
| 2 | " | 0.373 | 23.0 | 77.1 | 6.9 | 2.5 |
| 3 | 0.06 gpl CaCO₃ added | 0.373 | 47.2 | 85.8 | 4.7 | 1.3 |
| 4 | " | 0.373 | 39.5 | 86.4 | 3.7 | 1.0 |
| Test No. 2 | | | | | | |
| Conditions: | Plant Filling Liquor: | 123.7/190.8 = 0.648 T.T.S. 240 gpl | | | | |
| | Seed: Plant fine seed, at 60 gpl charge | | | | | |
| | Precipitation: 24 hrs. at 155°F., in duplicate | | | | | |
| 1 | No CaCO₃ added | 0.363 | 16.0 | 72.0 | 8.0 | 2.1 |
| 2 | " | 0.363 | 15.0 | 71.8 | 8.5 | 2.2 |
| 3 | 0.06 gpl CaCO₃ added | 0.368 | 22.0 | 76.1 | 7.0 | 1.5 |
| 4 | " | 0.368 | 25.2 | 75.0 | 7.8 | 1.4 |

EXAMPLE 2

Additional tests were carried out to demonstrate the advantages of the practices of this invention wherein calcium carbonate was added to synthetic Bayer pregnant liquors having varying caustic content. The results of these tests are set forth in accompanying Table II:

TABLE II

EFFECT OF ADDED CaCO₃ ON PARTICLE SIZE OF HYDRATE PRODUCT PRECIPITATED AT 150°F. for 24 hrs in SYNTHETIC ALUMINATE LIQUORS OF 160, 190, and 220 gpl CAUSTIC (as Na₂CO₃), 230 gpl T.T. Soda, 0.645 Ratios, and Seeded with 66.6 gpl of Bayer Fine Seed (80% −325 mesh)

| Sample | Caustic level (gpl) | CaCO₃ Added (gpl) | Hydrate Product (gpl) | +200 Mesh (as is) | −325 Mesh (as is) | −325 Mesh after Attrition |
|---|---|---|---|---|---|---|
| 1 | 160 | — | 143 | 30.4 | 9.2 | 20.0 |
| 2 | 160 | 0.06 | 142 | 39.2 | 7.6 | 16.0 |
| 3 | 190 | — | 147 | 27.2 | 8.8 | 20.4 |
| 4 | 190 | 0.06 | 146 | 32.4 | 7.6 | 15.2 |

N.B.: All CaCO₃ treated samples gave coarser products.

As indicated in the results reported in Tables I and II hereinabove the alumina trihydrate precipitated in the presence of added calcium carbonate was coarser and had a larger particle size, such as, for example, is evidenced by the percentage of the precipitated alumina trihydrate product having a particle size smaller than 325 mesh.

Additional tests were carried out involving a series of alumina trihydrate precipitations in Bayer process liquors and in synthetic Bayer process liquors made up from caustic pellets, soda ash and alumina trihydrate digested at 300°F, for 30 minutes. These tests and the results of these tests are set forth in accompanying Tables III, IV, V and VI:

The particle size of the resulting precipitated alumina trihydrate products, after a mild standard attrition (5 minutes recirculation in a miniature centrifugal pump), were compared. It was observed that the CaCO₃ treated samples contained about 4–5 percentage points less of −325 mesh fines than corresponding samples of alumina trihydrate precipitated in the absence of CaCO₃.

TABLE III

EFFECT OF ADDED CaCO₃ ON PARTICLE SIZE OF HYDRATE
PRODUCTS PRECIPITATED AT 150°F. for 24 HRS IN BAYER LIQUORS* OF 812.3 GPL CAUSTIC, 234.5 GPL T.T. SODA AND STARTING RATIO OF 0.607, SEEDED WITH 60 GPL FINE
BAYER SEED ADDED AS 30% SPENT LIQUOR SLURRY (AT 150°F.)

| Sample | CaCO₃ added (gpl) | Total Hydrate (gpl) | Particle Size (%) +200 Mesh (before attrition) | −325 Mesh (after attrition) |
|---|---|---|---|---|
| 1 | — | 127.3 | 16.4 | 38.0 |
| 2 | 0.06 | 127.5 | 16.4 | 21.2 |
| 3 | — | 127.3 | 24.0 | 33.6 |
| 4 | 0.08 | 127.0 | 41.6 | 20.0 |
| 5 | — | 127.3 | 17.6 | 36.4 |
| 6 | 0.10 | 124.0 | 11.2 | 30.0 |

*The original soluble CaO in the starting liquid (before seeding) was 0.007 gpl. To this were added extra amounts of 0.06, 0.08 and 0.10 gpl CaCO₃.

TABLE IV

EFFECT OF ADDED CaCO₃ ON PARTICLE SIZE OF HYDRATE PRODUCTS PRECIPITATED AT 150°F. FOR 24 HRS IN BAYER PLANT LIQUORS OF 182 GPL CAUSTIC,
242 GPL T.T. SODA AND 0.640 RATIO, WITH 78 GPL FINE BAYER SEED (80% −325 MESH)

| Sample | CaCO₃ added (gpl) | Total Hydrate Product (gpl) | Product Size +200 Mesh (before attrition) | −325 Mesh (after attrition) |
|---|---|---|---|---|
| 1 | — | 139.1 | 12.8 | 16.6 |
| 2 | 0.06 | 139.1 | 30.0 | 11.8 |
| 3 | — | 139.3 | 10.8 | 19.2 |
| 4 | 0.06 | 138.6 | 14.6 | 14.0 |

TABLE V

EFFECT OF ADDED CaCO₃ ON PARTICLE SIZE OF HYDRATE
PRODUCTS PRECIPITATED AT 150°F. for 24 HRS IN SYNTHETIC
ALUMINATE LIQUORS OF 160, 190, AND 220 GPL CAUSTIC
(AS Na₂CO₃), 230 GPL T.T. SODA, 0.645 RATIO, and SEEDED
WITH 66.6 GPL OF BAYER FINE SEED (80% −325 MESH)

| Sample | Caustic Level (gpl) | CaCO₃ added (gpl) | Hydrate Product (gpl) | Product Particle Size (%) +200 Mesh (before attrition) | −325 Mesh (before attrition) | −325 Mesh (after attrition) |
|---|---|---|---|---|---|---|
| 1 | 160 | — | 143 | 30.4 | 9.2 | 20.0 |
| 2 | 160 | 0.06 | 142 | 39.2 | 7.6 | 16.0 |
| 3 | 190 | — | 147 | 27.2 | 8.8 | 20.4 |
| 4 | 190 | 0.06 | 146 | 32.4 | 7.6 | 15.2 |
| 5 | 220 | — | 159 | 35.6 | 8.4 | 15.2 |
| 6 | 220 | 0.06 | 156 | 35.2 | 6.0 | 13.2 |

TABLE VI

EFFECT OF ADDED CaCO₃ ON PARTICLE SIZE OF HYDRATE
PRODUCTS PRECIPITATED AT 150°F for 24 HRS IN SYNTHETIC ALUMINATE LIQUORS of 160, 190 and 220 GPL CAUSTIC (AS Na₂CO₃), 230 GPL T.T. SODA, 0.610 RATIO, AND SEEDED WITH 66.6 GPL of BAYER FINE SEED
(80 % −325 MESH)

| Sample | Caustic (gpl) | CaCO₃ added (gpl) | Product (gpl) | Product Size (%) +200 Mesh (before attrition) | −325 Mesh (after attrition) |
|---|---|---|---|---|---|
| 1 | 160 | — | 134.1 | 11.2 | 34.6 |
| 2 | 160 | 0.06 | 133.7 | 12.6 | 31.6 |
| 3 | 190 | — | 139.8 | 10.6 | 29.6 |
| 4 | 190 | 0.06 | 138.5 | 24.8 | 22.4 |
| 5 | 220 | — | 146.2 | 20.0 | 24.4 |
| 6 | 220 | 0.06 | 133.7 | 16.0 | 21.6 |

In the results of the tests reported in the foregoing tables it is indicated that the effect of added CaCO₃ is modified by several factors, such as the amount of CaCO₃ added, liquor ratio, and the caustic level of the liquor undergoing treatment. In the reported tests the +200 mesh fraction "before attrition" indicates the extent of seed agglomeration whereas the −325 mesh fraction "after attrition" indicates both the agglomeration and the resistance to attrition of the respective products.

The data presented in Table III show a very large particle size difference between the alumina trihydrate products with and without CaCO₃ treatment. The treatment with CaCO₃ reduced the −325 mesh fraction by more than 15 percentage points. In this test there was employed wet seeding, i.e. the seed was added as 30% spent liquor slurry at 150°F. Up to 0.08 gpl CaCO₃ added there was virtually no loss in productivity.

The results in accompanying Table IV referred to a dry seeding at high charges of 78 gpl fine seed alumina trihydrate to a Bayer pregnant liquor of a high starting aluminacaustic ratio of 0.640. In this case the CaCO₃ treatment decreased the −325 mesh fraction in the product by about 5 percentage points as compared with the untreated sample.

The data reported in accompanying Tables V and VI indicate that in Bayer pregnant liquors having between 160 and 190 gpl caustic the addition of 0.06 gpl CaCO₃ reduced the −325 mesh fraction in the product by about 5 percentage points at the expense of a relatively small decrease in liquor productivity.

Upon examination of the alumina trihydrate precipitated in the presence of calcium carbonate there was observed that the alumina trihydrate particles exhibited more uniform, rounded-off outlines and possessed a more compact structure. The large number of small monocrystals growing between and around large monocrystals seem to exert a strengthening effect on the whole particle. It would appear that the reduction of fines in CaCO₃-treated alumina trihydrate precipitates results from the better agglomeration of growing seed particles, the particles being more compact and more resistant to attrition.

Based on tests carried out, it would appear that the beneficial effects of CaCO₃ addition to Bayer pregnant liquors for the precipitation of a coarsened alumina trihydrate are best observed or achieved, 1. when the alumina trihydrate seed charge is finely divided, such as about 80–90% having a particle size smaller than 325 mesh,
2. when high seed charges of about 50–60 gpl and higher alumina trihydrate are employed,
3. when the precipitation operation from the Bayer pregnant liquor is carried out with liquors having a low starting ratio, about 0.620,
4. when the filling temperatures are relatively low, about 150°F. and
5. wherein the precipitation operation is carried out at a relatively high rate of mixing-recirculation.

Under the above operation conditions the addition of CaCO₃ tends to give 10–15 percentage points less −325 mesh fines than an alumina trihydrate product precipitated in the absence of CaCO₃.

Satisfactory, but less than optimal, results are achieved when 1. the alumina trihydrate seed is relatively coarse, about 50%, having a particle size smaller than 325 mesh,
2. lower seed charges, about 30–40 gpl, alumina trihydrate are employed,
3. higher starting ratios, about 0.65, are employed with
4. higher filling temperatures, about 160 or higher and
5. with gentle mixing-recirculation. Under these less than optimum conditions the alumina trihydrate product would tend to give only about 5 percentage points less −325 mesh product as compared with corresponding alumina trihydrate precipitated in the absence of calcium carbonate.

Further illustrative of the advantages of the particles of this invention and supportive of the above, additional tests were carried out. These tests and the results of these tests are set forth in accompanying Tables VII, VIII and IX.

TABLE VII

COMPARATIVE PRECIPITATIONS WITH AND WITHOUT CaCO₃

Precipitation Conditions:
(i) Wet seeding: Bayer Fine Seed ~ 80% −325 mesh added as 30% slurry in spent liquor
(ii) 0.06 gpl CaCO₃ added as indicated.
(iii) Precipitated at 150°F. for 24 Hrs.
(iv) Filling Liquor: 119.7/186.3 = 0.643; T.T.S. 235.9 gpl.
(v) Spent Liquor (with seed): 64.0/188.0 = 0.340; T.T.S. 242.5 gpl.

| Sample | CaCO₃ added (gpl) | Seed charge (gpl) | cc Filling liquor in 1 liter Precipitation slurry | Al₂O₃ Precipitated (gpl) | Calculated End Ratio | productivity lb/cu.ft. On Filling Liquor | On Total Volume of Slurry | % −325 Mesh in product after attrition |
|---|---|---|---|---|---|---|---|---|
| 1 | 0.06 | 25 | 870 | 36.1 | 0.406 | 2.62 | 2.28 | 11.2 |
| 2 | 0.00 | 25 | 870 | 37.0 | 0.404 | 2.64 | 2.31 | 14.4 |

TABLE VII-continued

COMPARATIVE PRECIPITATIONS WITH AND WITHOUT $CaCO_3$

Precipitation Conditions:
(i) Wet seeding: Bayer Fine Seed ~ 80% —325 mesh added as 30% slurry in spent liquor
(ii) 0.06 gpl $CaCO_3$ added as indicated.
(iii) Precipitated at 150°F. for 24 Hrs.
(iv) Filling Liquor: 119.7/186.3 = 0.643; T.T.S. 2.35.9 gpl.
(v) Spent Liquor (with seed): 64.0/188.0 = 0.340; T.T.S. 242.5 gpl.

| Sample | $CaCO_3$ added (gpl) | Seed charge (gpl) | cc Filling liquor in 1 liter Precipitation slurry | $Al_2O_3$ Precipitated (gpl) | Calculated End Ratio | productivity lb/cu.ft. On Filling Liquor | On Total Volume of Slurry | % —325 Mesh in product after attrition |
|---|---|---|---|---|---|---|---|---|
| 3 | 0.06 | 35 | 850 | 38.5 | 0.398 | 2.82 | 2.40 | 14.8 |
| 4 | 0.00 | 35 | 850 | 38.8 | 0.396 | 2.84 | 2.42 | 21.6 |
| 5 | 0.06 | 45 | 825 | 39.2 | 0.378 | 2.97 | 2.44 | 24.0 |
| 6 | 0.00 | 45 | 825 | 39.4 | 0.376 | 2.98 | 2.46 | 30.8 |
| 7 | 0.06 | 55 | 800 | 39.6 | 0.368 | 3.09 | 2.47 | 32.8 |
| 8 | 0.00 | 55 | 800 | 40.0 | 0.366 | 3.12 | 2.49 | 39.2 |

TABLE VIII

COMPARATIVE LABORATORY PRECIPITATIONS WITH AND WITHOUT $CaCO_3$

Precipitation Conditions:
(i) Wet seeding: Bayer Fine Seed of about 80% —325 mesh added as 30% slurry in spent liquor
(ii) 0.06 gpl $CaCO_3$ added, as indicated.
(iii) Precipitated at 150°F. for 24 Hrs.
(iv) Filling liquor: 118.8/182.1 = 0.652; T.T.S. = 235.9 gpl
(v) spent liquor (with seed): 61.2/185.5 = 0.330; T.T.S. = 249.1 gpl

| Sample | $CaCO_3$ added (gpl) | Seed charge (gpl) | cc Filling liquor in 1-liter of slurry | $Al_2O_3$ Precipitated (gpl) | End Ratio (calculated) | Productivity lb/cu.ft on Filling Liquor | on Total Volume | % —325 Mesh in product after attrition |
|---|---|---|---|---|---|---|---|---|
| 1 | 0.06 | 55 | 870 | 44.9 | 0.362 | 3.22 | 2.80 | 24.4 |
| 2 | 0.00 | 55 | 870 | 44.7 | 0.362 | 3.21 | 2.78 | 35.6 |
| 3 | 0.06 | 65 | 850 | 44.1 | 0.359 | 3.24 | 2.75 | 37.2 |
| 4 | 0.00 | 65 | 850 | 44.7 | 0.355 | 3.27 | 2.78 | 56.0 |
| 5 | 0.06 | 75 | 825 | 43.8 | 0.352 | 3.32 | 2.73 | 50.8 |
| 6 | 0.00 | 75 | 825 | 44.6 | 0.350 | 3.38 | 2.76 | 60.0 |
| 7 | 0.06 | 85 | 800 | 43.5 | 0.346 | 3.40 | 2.71 | 58.0 |
| 8 | 0.00 | 85 | 800 | 44.2 | 0.344 | 3.44 | 2.75 | 66.0 |

TABLE IX

COMPARATIVE PRECIPITATIONS WITH AND WITHOUT $CaCO_3$

Precipitation Conditions:
(i) Filling liquor: 119.4/181.5 = 0.658; T.T.S. = 233 gpl.
(ii) Dry seeding (Bayer Fine Seed ~ 80% —325 Mesh)
(iii) 0.08 gpl $CaCO_3$ added, as indicated.
(iv) Precipitated at 150°F. for 24 Hrs.

| Sample | $CaCO_3$ added (gpl) | Seed Charge (gpl) | $Al_2O_3$ Precipitated (gpl) | End Ratio (calculated) | Productivity lb/cu.ft. | % —325 Mesh in Product after attrition |
|---|---|---|---|---|---|---|
| 1 | 0.08 | 55 | 51.4 | 0.375 | 3.20 | 21.6 |
| 2 | 0.00 | 55 | 51.0 | 0.376 | 3.18 | 27.6 |
| 3 | 0.08 | 65 | 52.7 | 0.372 | 3.28 | 30.4 |
| 4 | 0.00 | 65 | 53.4 | 0.364 | 3.33 | 33.2 |
| 5 | 0.08 | 75 | 53.0 | 0.363 | 3.31 | 34.0 |
| 6 | 0.00 | 75 | 54.2 | 0.360 | 3.38 | 40.4 |
| 7 | 0.08 | 85 | 54.4 | 0.358 | 3.40 | 40.8 |
| 8 | 0.00 | 85 | 54.9 | 0.355 | 3.42 | 47.2 |

The results reported in accompanying Tables VII and VIII involve tests employing the precipitation of alumina trihydrate from Bayer pregnant liquor by wet seeding, i.e. 30% seed in Bayer spent liquor. The data reported in Table VII show that up to about 50 gpl seed charge the liquor productivity increases with the seed charge. Above this, productivity based on filling liquor alone essentially levels off whereas the productivities calculated on total volume of the precipitation slurry starts to decline over 55 gpl seed charges. This decline would appear to be due to the dilution of the spent liquor introduced with the seed. Also, as indicated in the data of the accompanying Table VII, for small seed charges between 25 and 55 gpl an addition of 0.06 gpl $CaCO_3$ resulted in products having 6-7 percentage points less —325 mesh particles. On the other hand, with large seed charges between 55 and 85 gpl this difference was 10 percentage points, see Table VIII. With large seed charges of 55–85 gpl under dry seeding conditions, see Table IX, ever increasing liquor productivities were obtained but the particle size difference of the alumina trihydrate product with $CaCO_3$ addition was only 5 percentage points less —325 mesh as compared with alumina trihydrate precipitated in the absence of $CaCO_3$. This small, relative difference in particle size would appear to be due to high starting ratios, i.e. no dilution of the filling liquor with the seed slurry.

Tests were also carried out to determine the superiority of calcium carbonate addition over the addition of other calcium-containing compounds, such as CaO and $CaCl_2$. These tests shows that $CaCO_3$, CaO and $CaCl_2$ behave quite differently. In liquors of starting ratios above 0.610 these compounds act as follows:

1. $CaCO_3$ exerts the least inhibiting effect on liquid productivity and gives consistently best coarsening results, 7–10% on —325 mesh as compared with blank samples.
2. CaO showed the greatest inhibiting effect on liquor productivity without coarsening of the alumina trihydrate products, and
3. $CaCl_2$ tended to follow the action of $CaCO_3$ but it also tended to inhibit precipitation more than $CaCO_3$ giving erratic and inferior coarsening of the alumina trihydrate product.

Other tests illustrative of the advantages of the practices of this invention were carried out in Bayer plant liquors analyzing 190–200 gpl caustic (measured as $Na_2CO_3$), 120–125 gpl alumina and 240–245 gpl total titratable soda (TTS).

The seed charge employed was 60 gpl fine seed alumina trihydrate containing about 80% —325 mesh fraction. The precipitation was carried out in one-liter Monel Bottles rotating end-over-end at 14 RPM in constant temperature water bath at 150°F. for 24 hours.

These tests also showed that small additions of $CaCO_3$ to seeded Bayer aluminate liquors have a coarsening effect on the precipitated alumina trihydrate product, maximum coarsening being obtainable with a $CaCO_3$ addition of about 0.08 grams per liter, see the accompanying drawing. Improved results were otainable, however with $CaCO_3$ additions as low as 0.02 gram per liter and as high as 0.16 gram per liter. It was also observed in these tests that the strengths of the precipitated alumina trihydrate products, e.g. attrition resistance, increased with concentration of added $CaCO_3$ and that the relative effect of $CaCO_3$ was greater when the precipitation slurries were subjected to vigorous mechanical mixing during the precipitation. Under the conditions of vigorous mechanical agitation, all alumina trihydrate precipitation products were finer than comparative products obtained under mild mixing conditions, but the relative coarsening effect of $CaCO_3$ addition was more evident and more pronounced when the comparative products were obtained under identical vigorous mixing conditions.

As will be apparent to those skilled in the art in the light of the foregoing disclosure, many alterations, modifications and substitutions are possible in the practice of this invention without departing from the spirit or scope thereof.

I claim:

1. A method of precipitating alumina trihydrate from filtered Bayer pregnant liquor saturated with respect to alumina trihydrate and having a caustic content above about 160 gpl caustic measured as $Na_2CO_3$ to increase the amount of alumina trihydrate having a particle size greater than 325 mesh, which comprises adding to said filtered Bayer pregnant liquor fine seed alumina trihydrate as a precipitating agent for the precipitation of alumina trihydrate from said filtered Bayer pregnant liquor and substantially simultaneously with the addition of said fine seed alumina trihydrate to said filtered Bayer pregnant liquor adding an amount of finely divided solid calcium carbonate in the range about 0.02–0.2 gpl of said filtered Bayer pregnant liquor whereby the precipitated alumina trihydrate has an increased amount of alumina trihydrate having a particle size greater than 325 mesh as compared with the alumina trihydrate precipitated in the absence of said added calcium carbonate.

2. A method in accordance with claim 1 wherein the fine seed alumina trihydrate employed as a precipitating agent for the precipitation of alumina trihydrate from Bayer pregnant liquor has a particle size such that at least about 60% by weight of said alumina trihydrate is smaller than 325 mesh.

3. A method in accordance with claim 1 wherein said calcium carbonate is added in an amount in the range from about 0.05 to about 0.1 gpl based on said Bayer pregnant liquor.

4. A method in accordance with claim 1 wherein the caustic content of said Bayer pregnant liquor measured as $Na_2CO_3$ is in the range from about 180 gpl to about 220 gpl.

5. A method in accordance with claim 1 wherein said fine seed alumina trihydrate is added in an amount above about 50 gpl of said Bayer pregnant liquor.

6. A method in accordance with claim 1 wherein said fine seed alumina trihydrate is added in an amount in the range from about 50 gpl to about 90 gpl based on said Bayer pregnant liquor.

7. A method in accordance with claim 1 wherein said fine seed alumina trihydrate is added in an amount above about 50 gpl of said Bayer pregnant liquor, said fine seed alumina trihydrate having a particle size such that at least about 60% by weight of said alumina trihydrate is smaller than 325 mesh.

* * * * *